United States Patent

[11] 3,578,925

| [72] | Inventors | John L. Drown<br>Monroeville;<br>Nagar J. Patel, East McKeesport, Pa. |
|---|---|---|
| [21] | Appl. No. | 879,189 |
| [22] | Filed | Nov. 24, 1969 |
| [45] | Patented | May 18, 1971 |
| [73] | Assignee | Westinghouse Electric Corporation<br>Pittsburgh, Pa. |

[54] DRAWOUT-TYPE SWITCHGEAR
8 Claims, 5 Drawing Figs.

[52] U.S. Cl. .................................................. 200/50
[51] Int. Cl. .................................................. H01h 9/20
[50] Field of Search .................................... 200/50.15

[56] References Cited
UNITED STATES PATENTS
2,777,024  1/1957  West .......................... 200/50.15

Primary Examiner—Robert K. Schaefer
Assistant Examiner—M. Ginsburg
Attorneys—A. T. Stratton, C. L. McHale and W. A. Elchik ABSTRACT: Drawout-type switchgear comprises a levering-in mechanism for levering a circuit-interrupting unit into a connected position in a cell with improved means stopping movement of the circuit-interrupting unit when the circuit-interrupting unit reaches the connected position.

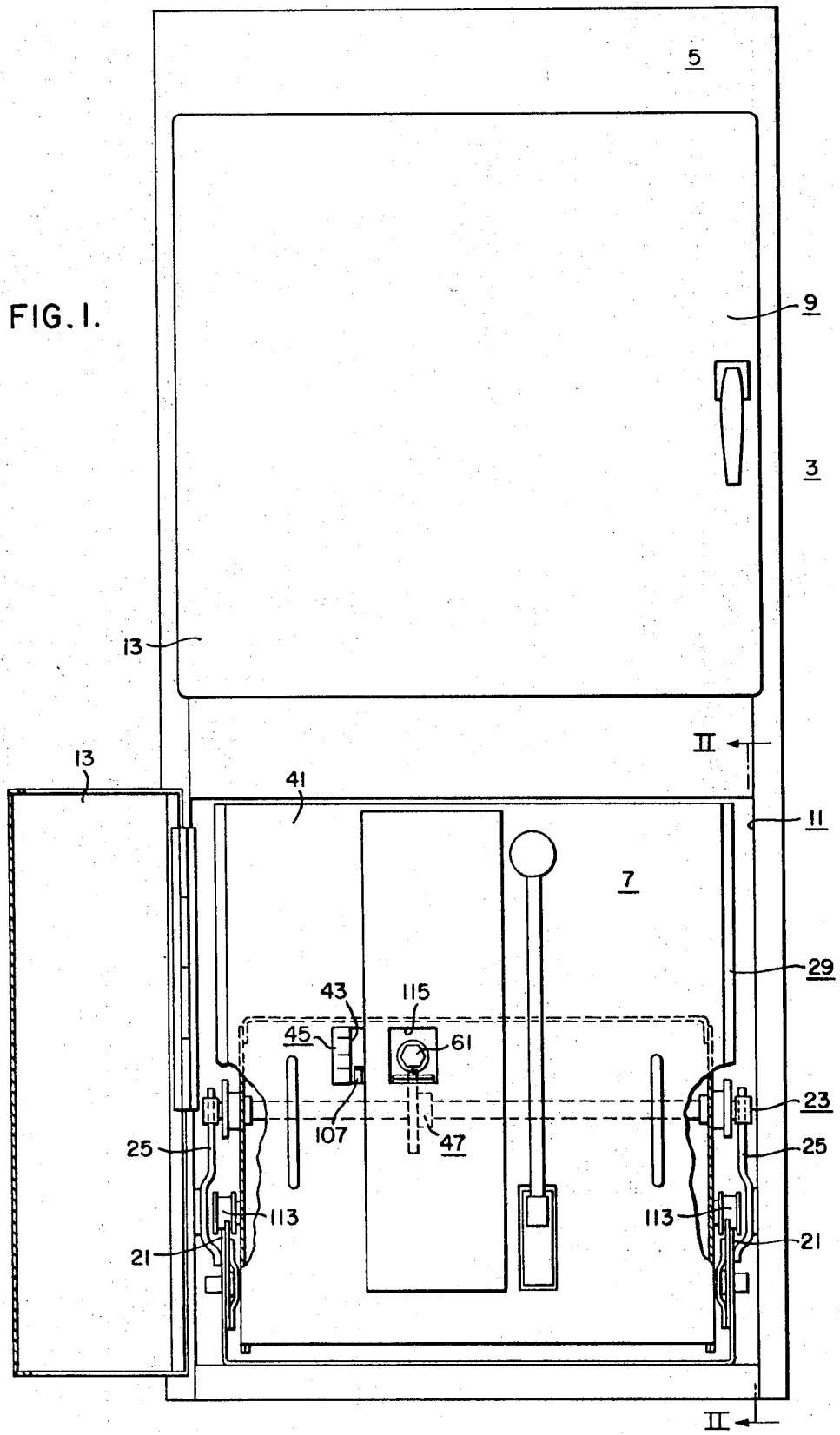

DRAWOUT-TYPE SWITCHGEAR

CROSS-REFERENCE TO RELATED APPLICATION

Certain parts of the structure herein disclosed are disclosed and claimed in the copending application of George Sivy, Ser. No. 879,190, filed concurrently herewith.

BACKGROUND OF THE INVENTION

1. Field of the Invention

Drawout-type switchgear with levering-in means.

2. Description of the Prior Art

It is old in the art of drawout type switchgear to provide a levering-in mechanism for levering a circuit interrupting unit into a cell with stop means stopping the unit in the connected position in the cell. This invention is an improvement over the prior art in that a traveling stop nut is mounted on a threaded portion of the operating shaft of the levering-in mechanism which stop nut binds with the operating shaft in the fully connected position of the unit and engages a plate, that is part of the circuit interrupter unit, to prevent rotation of the operating shaft to thereby stop operation of the levering-in mechanism in the connected position of the circuit-interrupting unit.

SUMMARY OF THE INVENTION

Metal-enclosed drawout type switchgear comprises a cell and a circuit-interrupting unit disposed for movement in the cell. A levering-in mechanism comprises a movable levering structure supported on the circuit-interrupting unit. The movable levering structure comprises an operating shaft, supported for rotation about an axis that extends in the direction of movement of the circuit-interrupting unit, a levering shaft, supported for rotation about an axis that extends transverse to the direction of movement of the circuit-interrupting unit, and a worm gear structure operatively connecting the operating shaft with the levering shaft. Upon rotation of the operating shaft the worm gear structure is operated to rotate the levering shaft to thereby rotate a pair of roller arms that cooperate with a stationary structure in the cell to lever the circuit-interrupting unit into the connected position. The operating shaft comprises a threaded portion on the inner end thereof, and a hexagonal traveling stop nut is mounted on the threaded portion. One of the flats of the hexagonal traveling stop nut engages a plate of the circuit-interrupting unit to prevent rotation of the stop nut while permitting the stop nut to slide along the plate. Thus, as the operating shaft is rotated the stop nut moves axially thereon. When the circuit-interrupting unit reaches the fully connected position, the end of the operating shaft engages a stop surface in a blind hole in the traveling stop nut so that the operating shaft and traveling stop nut bind and thereafter move as a unitary structure, and with the flat of the traveling stop nut engaging the plate to prevent rotation of the traveling stop nut, the operating shaft cannot be thereafter rotated. Thus, when the circuit-interrupting unit is in the connected portion any further effort to operate the levering-in mechanism is prevented by the engagement of the stop plate with the traveling stop nut that moves unitarily with the operating shaft so that the force of an operator attempting to further lever in the circuit-interrupting unit does not stress the teeth of the gear structure of the levering-in device. The stop means is a simple construction that involves mounting a single traveling stop nut on the end of the operating shaft in proximity to a plate, and since any one of the six flats of the hexagonal traveling stop nut can be positioned under the plate the stop means enables the assembler to accurately adjust the stopping action of the stop means.

BRIEF DESCRIPTION OF THE DRAWINGS

FIG. 1 is a front view, with parts broken away, of metal-enclosed drawout switchgear constructed in accordance with the principles of this invention;

DESCRIPTION OF THE PREFERRED EMBODIMENT

Figure 5:
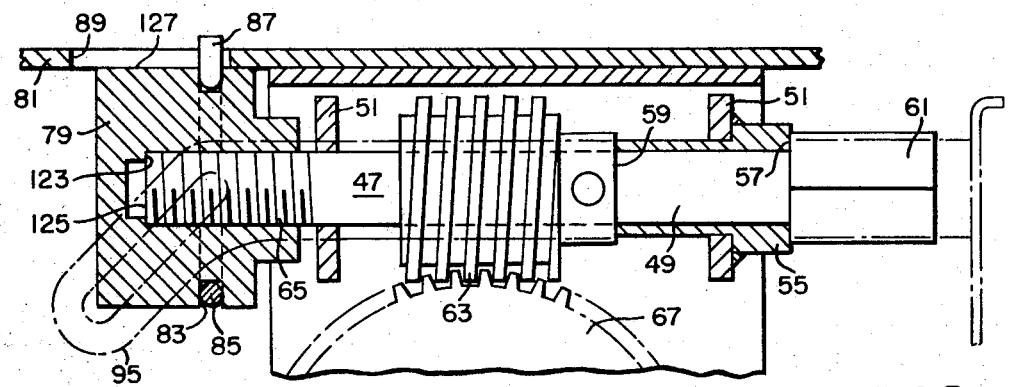
FIG. 5 is a sectional view illustrating the means for stopping the circuit-interrupting unit in the connected position thereof.

Referring to the drawings, there is shown, in FIG. 1, metal-enclosed switchgear 3 comprising an enclosure 5 and a drawout-type circuit-interrupting unit 7. The enclosure 5 comprises sheet metal and supports formed to provide a plurality of cells or compartments, two of which are disclosed at 9 and 11. Each of the cells 9, 11 is provided with an opening at the front thereof. Doors 13 are supported on the enclosure 5 for movement between open and closed positions to provide access to the circuit-interrupting units in the cells. In each cell, at the back part thereof opposite the front opening of the cell, there are a pair of stationary primary terminals 15, 17 for each pole unit of the associated circuit-interrupting unit. There is also a stationary secondary terminal supported at the back of each cell. In each cell, there are a pair of tracks 21, that provide a track structure in a manner to be hereinafter disclosed, and a stationary levering structure 23 comprising a pair of stationary slotted plates 25 supported in the enclosure 5.

Figure 4:
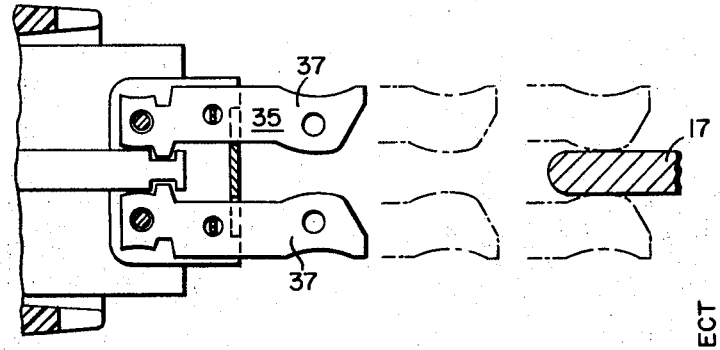
FIG. 4 is a partial sectional view taken generally along the line IV—IV of FIG. 2.

The circuit-interrupting unit 7 is a circuit breaker of the type more specifically described in the patent application of Fred Bould et al. entitled "Circuit Breaker" Ser. No. 770,296 filed Oct. 24, 1968, and assigned to the assignee of the subject application. The circuit breaker 7 comprises a support structure 29 and a multipole circuit breaker mechanism supported on the support structure 29. The circuit breaker mechanism may be any of a well-known type comprising a pair of cooperable contacts for each pole of the breaker and an operating mechanism operable to simultaneously open and close the contacts of all of the poles. A movable secondary terminal 31 is fixedly supported on the support structure 29 of the circuit breaker 7 for cooperation with the stationary secondary terminal 19 in a manner to be hereinafter disclosed. A pair of movable primary terminals 33, 35, for each pole unit of the breaker 7 are fixedly supported on the support structure 29 of the circuit breaker 7 for cooperation with the stationary primary terminals 15, 17 in a manner to be hereinafter described. Each pair of movable primary terminals 33, 35 cooperates with the associated pair of stationary primary terminals 15, 17, to connect and disconnect the associated pole unit contacts in an electric circuit in a manner well known in the art. As is illustrated in FIG. 4, each of the stationary primary terminals 15, 17 is a stab-type conductor and each of the movable primary terminals 33, 35 comprises a plurality of contact fingers 37 biased toward each other to clip onto the associated stab-type stationary primary terminal when the movable primary terminal is moved into the connected position shown in broken lines in FIG. 4.

The support structure 29, of the circuit breaker 7, comprises a pair of sideplates 39 and a front plate 41. The front plate 41 has a window opening 43 (FIG. 1) therein, and an indicating plate 45 thereon opposite the opening 43 for providing a visual indication of the positions of the circuit breaker 7 in a manner described in the above-mentioned copending application of George Sivy.

The switchgear 3 comprises a levering-in mechanism 23 (FIG. 1) that comprises the stationary structure 25 supported on the enclosure 5 and a movable levering structure 47 supported on the circuit breaker or circuit-interrupting unit 7. The movable levering structure 47 (FIG. 3) comprises an operating shaft structure 49 rotatably supported on a pair of support plates 51 that are supported on a pair of support plates 53. The plates 51, 53 are part of the support structure 29 of the circuit-interrupting unit. The operating shaft 49 is supported in a tubular support member 55 that receives a portion of the shaft 49 and that is welded or otherwise fixedly supported on one of the support plates 51. The support 55 comprises a surface that engages a shoulder 57 of the shaft 49 at one end thereof and a shoulder 59 of the shaft 49 at the other end thereof to prevent axial movement of the operating shaft 49. The operating shaft 49 comprises a hexagonal front part 61, for receiving a tool that may be used to crank the shaft 49, a worm 63 intermediate the ends thereof and a threaded part 65 at the back end thereof. The worm 63 cooperates with a gear 67 that is fixedly secured to a levering shaft 69. The levering shaft 69 is supported on the support plates 53 and the side plates 39 for rotational movement. The ends of the levering shaft 69 extend out through openings in the sideplates 39 and a pair of roller arms 71 are fixedly secured to the opposite ends of the levering shaft 69. Each of the roller arms 71 has a roller 73 rotatably supported on a pin 75 that is fixed to the associated roller arm 71. A stop pin 77 is fixedly supported on one of the side plates 39 to engage the associated roller arm 71 to limit movement of the levering shaft 69 in one direction. A hexagonal traveling stop nut 79 is supported on the threaded portion 65 of the operating shaft 49. The nut 79 is supported just under a plate 81 that is a part of the breaker support structure 29, with one flat face of the hexagonal nut 79 engaging the flat under surface of the plate 81 to prevent rotational movement of the nut 79 when the operating shaft 49 is rotated. The nut 79 moves axially on the threaded portion 65 sliding against the under surface of the plate 81 as the operating shaft 49 is rotated. The nut 79 is provided with a slot 83 that receives a spring clip 85. The spring clip 85 comprises an annular portion fitting within the slot 83. The clip 85, at one end 87 thereof, extends through a slot 89 in the plate 81. The other end 91 of the spring clip 85 extends through a slot 93 in one end of an elongated indicating member 95. With the spring clip 85 positioned in the slot 83 of the nut 79 and with the opposite ends of the spring clip 85 positioned in the slots 89, 93, the spring clip 85 moves axially with the nut 79 to operate the indicating member 95 as the operating shaft 49 is rotated. The elongated indicating member 95 is pivotally supported, intermediate the ends thereof, on a pin 101 that is secured to one of the plates 53, and a torsion spring 103 biases the indicating member 95 in a clockwise direction, which movement is limited by the engagement of the pin part 91 of the spring clip 85 in the slot 93. The torsion spring 103 is provided to take up any loose or slack movement between the spring clip 85 and the indicating member 95 to provide a more positive indication of the position of the circuit breaker in the cell. The indicating member 95, at the other end thereof, comprises a bent-over indicating projection 107 that is disposed at the opening 43 (FIG. 1 and 3) in the front plate 41 to provide a front visual indication of the position of the indicating member 95 to thereby provide a front visual indication of the position of the circuit breaker 7 in the cell 11.

Figure 2:
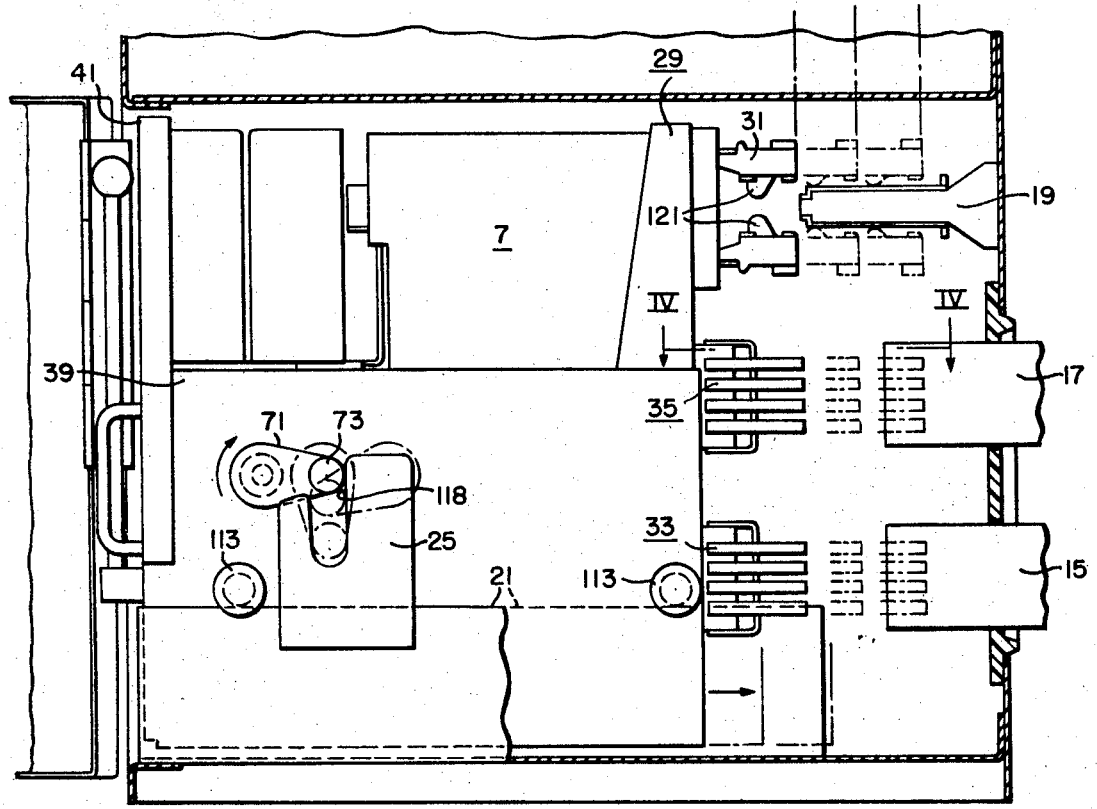
FIG. 2 is a sectional view taken generally along the line II—II of FIG. 1.
Figure 3:
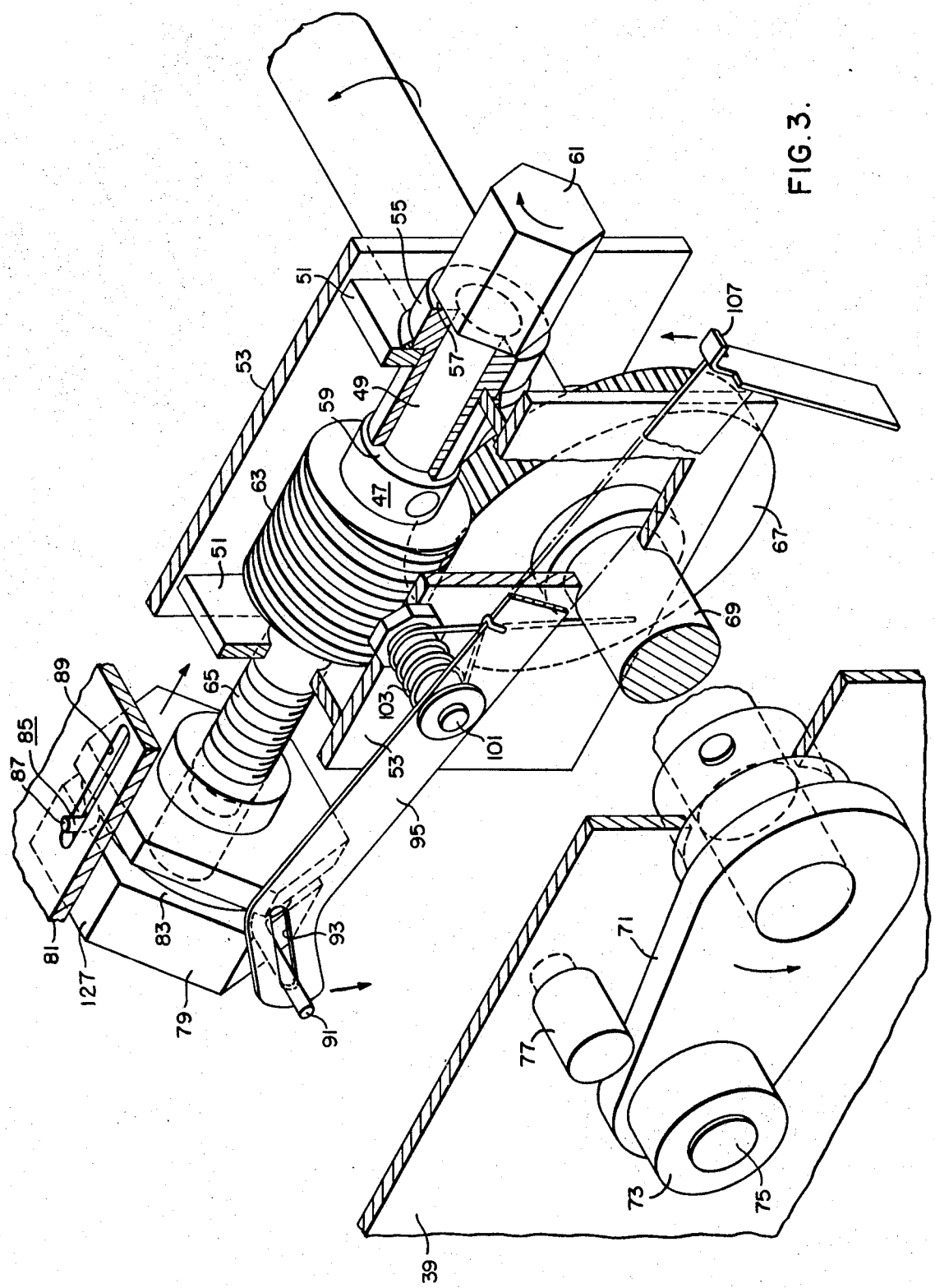
FIG. 3 is a perspective view, with parts broken away, illustrating the levering-in mechanism of the switchgear seen in FIGS. 1 and 2.

The circuit interrupting unit or circuit breaker 7 is shown in FIGS. 1—3 in the disconnected position. As can be seen in FIG. 2, in the disconnected position of the circuit-interrupting unit 7 the movable primary terminals 33, 35 are disengaged from the stationary primary terminals 15, 17 and the movable secondary terminal 31 is disengaged from the stationary secondary terminal 19. In this position, the traveling nut 79 (FIG. 3) is in an axial position such that the pin 91, in the slot 93 of the indicating member 95, positions the indicating member 95 such that the indicating projection 107 is in the lower position wherein the projection 107, in the opening 43 (FIG. 1), is opposite the disconnected indicia on the front plate 41 to indicate that the circuit-interrupting unit 7 is in the disconnected position. As can be understood with reference to FIGS. 1 and 2, two pairs of rollers or wheels 113 are rotatably mounted on the sideplates 39 of the circuit-interrupting unit 7 with the wheels 113 engaging the tracks 21 of the enclosure 5 to support the circuit-interrupting unit 7 for rectilinear movement in the associated cell 11 of the enclosure 5. The front panel 41 (FIG. 1) of the circuit-interrupting unit 7 is provided with an opening 115 to provide access to the hexagonal front part 61 of the operating shaft 49 when the door 13 of the cell 11 is in the open position. With the door 13 in the open position, a crank tool can be applied to the hexagonal part 61 of the operating shaft 49 and the operating shaft 49 can be manually rotated in a clockwise (FIGS. 1 and 3) direction to lever the circuit-interrupting unit 7 into the cell 11. Upon clockwise rotation of the operating shaft 49, the worm 63, operating against the gear 67, rotates the levering shaft 69 in a counterclockwise (FIG. 3) direction. Because of the different views illustrated in FIGS. 2 and 3, the levering shaft 69, upon levering-in rotation thereof, moves in a clockwise direction as shown in FIG. 2. Upon levering-in rotation of the levering shaft 69, the roller arms 71 move the rollers 73 in slots 118 (FIG. 2) in the stationary members 25 with the rollers 73 engaging surfaces of the stationary members 25 to draw the circuit-interrupting unit 7 inward (to the right) as seen in FIG. 2. During this movement of the circuit-interrupting unit 7, a pair of spring-biased contacts 121 (FIG. 2) of the movable secondary terminal 31 engage opposite conducting surfaces of the stationary secondary terminal 19 in the intermediate or test position indicated in FIG. 2. In this position, the movable primary terminals 33, 35 are disengaged or disconnected from the stationary primary terminals 15, 17 and the movable secondary terminal 31 is engaged or connected with the stationary secondary terminal 19 to connect the various control components of the circuit-interrupting unit in a test circuit so that an operator can test the operation of the circuit-interrupting unit 7 without energizing the circuit to be controlled by the circuit-interrupting unit 7. Upon further rotation of the operating shaft 49, the rollers 73 (FIG. 2) operating in the slots 118 of the stationary members 29, force the circuit-interrupting unit 7 into the connected position illustrated in broken lines in FIG. 2. In the connected position, the movable secondary terminal 31 is connected with the stationary secondary terminal 19 and each pair of movable primary terminals 33, 35 is connected with the associated pair of stationary primary terminals 15, 17. As can be understood with reference to FIG. 4, each of the movable primary terminals 35 comprises a plurality of contact fingers 37 that are biased toward each other and that clip on to the associated stab-type stationary primary terminal conductor 17.

When it is desired to withdraw the circuit-interrupting unit 7, the operating shaft 49 is rotated in a counterclockwise (FIGS. 1 and 3) direction to rotate the levering shaft 69 clockwise (FIG. 3) to move the rollers 73 on the roller arms 71 in the slots 118 of the stationary members 25 to force the circuit-interrupting unit 7 from the connected position to the test position and then from the test position to the disconnected position seen in full lines in FIG. 2. Rotation of the operating shaft 49 is stopped in the disconnected position when the one roller arm 71 engages the stop member 77. Rotation of the operating shaft 49 is stopped in the connected position in a manner to be hereinafter described.

Referring to FIGS. 5—7, it will be understood that with the nut 79 supported on the threaded portion 65 of the operating shaft 49, and with the top flat face of the hexagonal nut 79 engaging the under surface of the plate 81 to prevent rotation of the nut 79 as the operating shaft rotates, rotation of the operating shaft 49 to lever the circuit-interrupting unit 7 in the direction toward the disconnected position will move the nut 79 axially to the left (FIG. 3) and rotation of the operating shaft 49 in the direction toward the connected position will move the nut 79 axially to the right on the threaded part 65 (FIG. 3). As the nut 79 moves axially on the threaded part 65, the upper flat face of the nut 79 slides against the undersurface of the plate 81. As the nut 79 moves to the right from the disconnected position to the test position the pin part 91 of the spring clip 85, in the slot 93 of the indicating member 95, cams the indicating member 95 in a counterclockwise (FIG. 3) direction to move the indicating projection 107 from the lower position to the intermediate position to indicate that the circuit-interrupting unit is in the test position. As the circuit-interrupting unit is moved into the connected position, the pin part 91 of the spring clip 85 cams the indicating member 95 to move the indicating member 95 to the connected position wherein the indicating projection 107 is in the upper position. Upon reverse movement of the circuit-interrupting unit 7, the traveling nut 79 moves the pin 91 of the spring clip 85 to operate in the slot 93 of the indicating member 95 to cam the indicating member 95 from the connected position to the test position and upon further movement of the circuit-interrupting unit 7 to the disconnected position, the pin 91, operating in the slot 93, moves the indicating member 95 to the lower or disconnected position seen in FIG. 1. The indicating member 95 and movable levering structure 47 (FIG. 3) are all mounted on the circuit-interrupting unit 7 as part of the circuit-interrupting unit 7 to facilitate easy assembly of the switchgear and to provide accurate adjusted coordination between the indicating member 95 and the movable levering-in structure 47.

As was hereinbefore set forth, as the operating shaft 49 is rotated to the circuit-interrupting unit to the disconnected position the traveling stop nut 79, moving axially on the threaded part 65, moves to the left to the position shown in FIG. 3 wherein the part 87 of the spring 85 is at the back portion of the slot 89. When the circuit-interrupting unit reaches the disconnected position, the roller arms 71 engage the pins 77 on the sideplates 39 to limit operation of the levering-in mechanism. In the disconnected position, the circuit interrupting unit is in the outer position at the opening in the associated cell so that an operator can readily recognize that the circuit breaker is disconnected and there is no need for the operator to continually attempt to crank the operating shaft 49. As the operating shaft 49 is rotated to lever the circuit interrupting unit into the connected position, the traveling stop nut 79 moves axially on the threaded portion 65 of the operating shaft 49 to the right (FIG. 5) with the part 87 of the spring clip 85 moving to the right in the slot 89. As can be seen in FIG. 5, the tapped opening in the traveling stop nut 79 is a blind opening that does not extend completely through the nut 79, and a shoulder portion 123 in the opening of the nut 79 is provided to engage the end 125 of the operating shaft 49. Thus, when the circuit-interrupting unit is in the fully connected position the traveling stop nut 79 has moved axially to the right (FIG. 5) to the position where the end part 125 of the operating shaft 49 engages the shoulder or stop surface 123 on the traveling stop nut 79, and the parts bind so that the operating shaft 49 and traveling stop nut 79 thereafter will rotate as a unitary structure. Unitary rotation of the operating shaft 49 and traveling stop nut 79 is prevented because of the engagement of the one flat face 127 of the hexagonal traveling stop nut 79 with the undersurface of the plate 81. Thus, an operator cannot continue rotating the operating shaft 49 and if the operator applies force in an attempt to continue levering the circuit-interrupting unit inward, the forces of the operator's effort will operate on the nut 79 and plate 81 and they will not damage the teeth between the gears 63—67. With the provision of a hexagonal traveling stop nut, an assembler can select from either of the six flat faces as a stop surface thereby providing a fine coordinated adjustment of the stopping action of the traveling stop nut 79 to thereby provide that the circuit-interrupting unit will be in the intended fully connected position when the stop means stops operation of the levering-in mechanism. Careful selection of one of the six flat faces of the hexagonal traveling stop nut 79 provides an adjustment of the stopping point of the rotational movement of the operating shaft 49, and thereby rotational movement of the worm 63, in 60° steps. By relating the 60° steps in the position of the worm 63 to the proportional length of the roller arms, it can be understood that a finite adjustment of the rotational position of the roller arms can be obtained, which rotational position determines the position of the circuit-interrupting unit in relation to the stationary terminals in the rear of the cell.

It can be understood that the traveling stop nut provides a plurality of flats that can be utilized to provide the stopping action and that for certain applications a traveling stop nut having more than six flats or less than six flats could be used depending upon the needs or desires during the assembly of the unit. For example, a square traveling stop nut could be used providing four flats or an octagonal traveling stop nut could be used providing eight flats.

We claim:

1. Drawout switchgear comprising a cell having an opening at the front thereof, stationary primary terminal means supported in said cell,
a circuit-interrupting unit disposed for movement in said cell and comprising movable primary terminal means movable with said circuit-interrupting unit,
a levering-in mechanism comprising an operating shaft supported for rotation about an axis that extends generally in the direction of movement of said circuit-interrupting unit and a levering shaft rotatable about an axis that extends transverse to the direction of movement of said circuit-interrupting unit, gear means connecting said operating shaft to operate said levering shaft, said operating shaft comprising a threaded part, a stop nut supported on said threaded part, rotation-preventing means preventing rotation of said stop nut with said operating shaft whereby said stop nut moves axially on said threaded part as said operating shaft rotates, stop means on said stop nut engaging said operating shaft in the fully connected position of said circuit-interrupting unit to limit axial movement of said stop nut relative to said threaded part whereby said operating shaft and said stop nut rotate as a unit which unitary rotation is prevented by said rotation-preventing means to thereby limit operation of said levering-in mechanism when said circuit-interrupting unit is in the fully connected position.

2. Drawout switchgear according to claim 1, said levering-in mechanism comprising a stationary levering structure on said cell and a movable levering structure on said circuit-interrupting unit cooperable with said stationary levering structure, said stationary levering structure comprising slot means including a pair of slotted brackets stationarily supported on said cell, said movable levering structure comprising said operating shaft said gear means and said levering shaft all of which are supported on said circuit-interrupting unit for movement with said circuit-interrupting unit, a pair of arm members supported on the opposite ends of said levering shaft to move in said slot means as said levering shaft is rotated to thereby move said circuit-interrupting unit in said cell upon rotation of said operating shaft.

3. Drawout switchgear according to claim 1, said stop nut comprising a flat surface at the periphery thereof, said rotation-preventing means comprising a rotation-preventing surface engaging said flat surface of said stop nut to prevent rotation of said stop nut while permitting said flat surface of said stop nut to slide against said rotation-preventing surface as said stop nut moves axially.

4. Drawout switchgear according to claim 2, said rotation-preventing means comprising a plate surface on said circuit-interrupting unit engaging said stop means on said nut to prevent rotation of said nut.

5. Drawout switchgear according to claim 3, said nut comprising a plurality of said flat surfaces around the periphery thereof, and said nut being positioned on said threaded part with a selected one of said plurality of flat surfaces engaging said rotation-preventing surface.

6. Drawout switchgear according to claim 5, said nut being a hexagonal nut providing six flat surfaces for selection as said selected one of said plurality of flat surfaces for engagement with said rotation-preventing surface.

7. Drawout switchgear according to claim 1, said stop means on said nut being a stop surface in a tapped opening of said nut for engaging a stop surface on said operating shaft at the end of the threaded part of said operating shaft.

8. Drawout switchgear according to claim 5, said stop means on said nut being a stop surface in said nut at the inner end of an internal threaded part of said nut, and said operating shaft at the end of the threaded part thereof comprising a stop part engaging said stop surface in said nut when said circuit-interrupting unit is in the fully connected position to thereby bind said nut with said operating shaft such that said selected one of said plurality of flat surfaces engaging said rotation-preventing surface prevents rotation of said operating shaft.